United States Patent [19]
Ishihara et al.

[11] Patent Number: 4,828,065
[45] Date of Patent: May 9, 1989

[54] ELECTRONICALLY CONTROLLED POWER STEERING SYSTEM

[75] Inventors: Satoru Ishihara, Yokosuka; Hideo Ito, Zushi; Masatsugu Yokote, Yokohama; Kenji Kawagoe, Yokosuka, all of Japan

[73] Assignee: Nissan Motor Co., Ltd., Yokohama, Japan

[21] Appl. No.: 190,067

[22] Filed: May 4, 1988

[30] Foreign Application Priority Data

May 13, 1987 [JP] Japan ................................. 62-116263

[51] Int. Cl.[4] .............................................. B62D 5/08
[52] U.S. Cl. ................................. 180/142; 364/424.01
[58] Field of Search ............................. 180/142, 141; 364/424.01

[56] References Cited

U.S. PATENT DOCUMENTS

| | | | |
|---|---|---|---|
| 4,473,128 | 9/1984 | Nakayama et al. | 180/142 |
| 4,691,796 | 6/1987 | Tannoka et al. | 180/142 |
| 4,706,771 | 11/1987 | Kawabe et al. | 180/142 |

FOREIGN PATENT DOCUMENTS 53-32129 9/1978 Japan.
57-209471 12/1982 Japan.

Primary Examiner—John A. Pekar
Attorney, Agent, or Firm—Foley & Lardner, Schwartz, Jeffery, Schwaab, Mack, Blumenthal & Evans

[57] ABSTRACT

An electronically controlled power steering system comprises a vehicle speed sensor, a steering wheel angle sensor, a power steering gear including a control valve, a bypass valve for regulating a flow rate of hydraulic fluid supplied to the control valve of the power steering gear in response to a control signal generated by a controller. The controller is operative responsive to sensor output signals of the sensors for generating the control signal. With the controller, the control signal is varied in response to the vehicle speed and the steering wheel angle when the steering wheel angle is less than a predetermined value, but this varying tendency of the control signal in response to the steering wheel angle is restrained when the steering wheel angle is not less than the predetermined value.

4 Claims, 5 Drawing Sheets

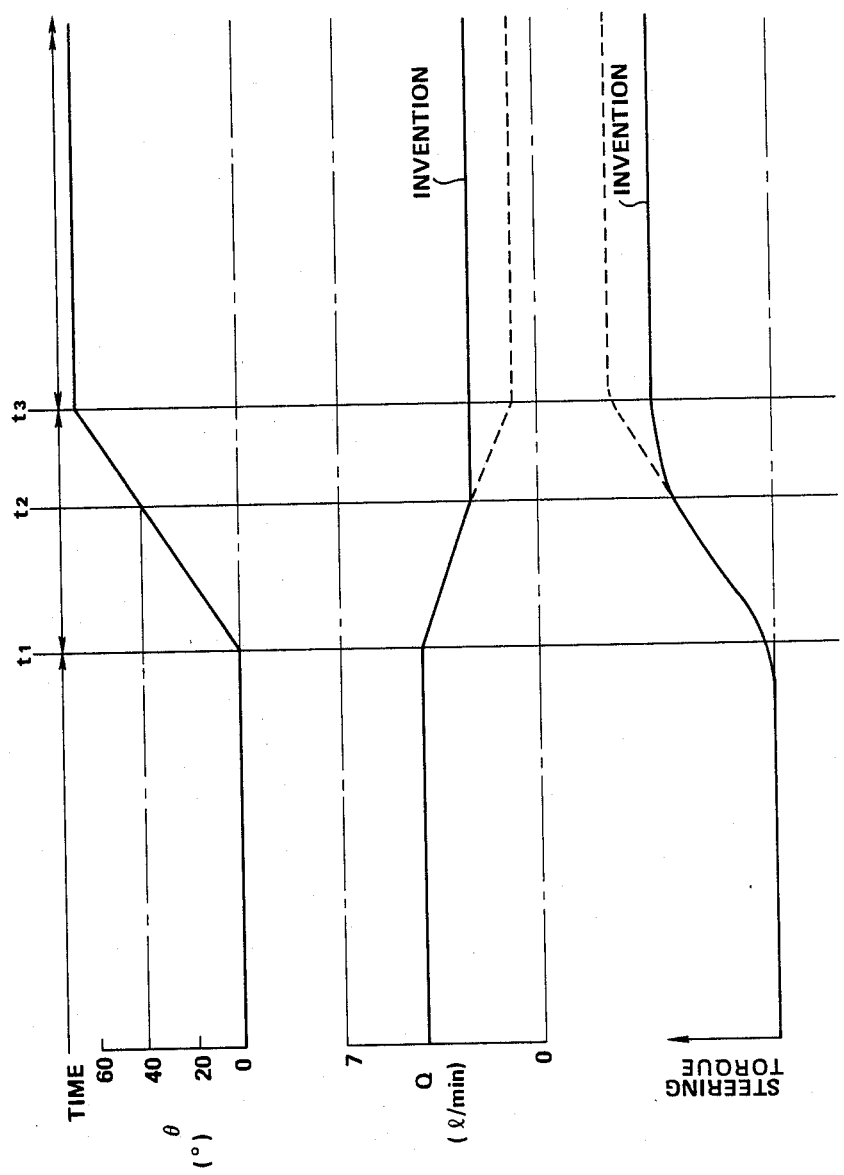

ELECTRONICALLY CONTROLLED POWER STEERING SYSTEM

BACKGROUND OF THE INVENTION

The present invention relates to an electronically controlled power steering system.

JP 53-32129 B discloses an electronically controlled power steering system which includes sensors for measuring a vehicle speed, a side acceleration and a steering wheel angle, an arithmetic circuit making a judgement on the sensor output signals, and a servo valve converting an output of the arithmetic circuit to a hydraulic fluid pressure signal which is supplied to a reaction chamber of a servo mechanism of a steering linkage. With this known power steering system, a steering torque needed to manipulate a steering wheel increases in proportion to an increase in a steering wheel angle since a flow rate of hydraulic fluid supplied to the servo mechanism decreases as the steering wheel angle increases.

JP 57-209471 A discloses an electronically controlled power steering system which includes a steer angle sensor, a vehicle speed sensor and a control circuit receiving the sensor output signals, a solenoid operated bypass valve fluidly disposed between both chamber of a power cylinder, and a driver responsive to the output of the control circuit for regulating electric current passing through the solenoid operated bypass valve such that the flow rate of bypass fluid therethrough varies in response to the magnitude of the electric current. With this known power steering control system, a steering torque needed to manipulate a steering wheel increases as the steer angle increases and/or the vehicle speed increases.

The common problem encountered with the above-mentioned power steering systems resides in that a steering torque needed to manipulate a steering wheel increases excessively in turning the steering wheel through a large steering wheel angle, and thus controllability of a vehicle is very bad.

An object of the present invention is to provide an electronically controlled power steering system which restrains an increasing trend of a steering torque during turning a steering wheel through a large steering wheel angle so as to make it easy to control a vehicle during turning of the steering wheel through the large steering wheel angle, thus providing enhanced running stability and safety.

SUMMARY OF THE INVENTION

According to the present invention, there is provided an electronically controlled power steering system comprises a vehicle speed sensor, a steering wheel angle sensor, a power steering gear including a control valve, a bypass valve for regulating a flow rate of hydraulic fluid supplied to the control valve of the power steering gear in response to a control signal generated by a controller. The controller is operative responsive to sensor output signals of the sensors for generating the control signal. With the controller, the control signal is varied in response to the vehicle speed and the steering wheel angle when the steering wheel angle is less than a predetermined value, but this varying tendency of the control signal in response to the steering wheel angle is restrained when the steering wheel angle is not less than the predetermined value.

Specifically, according to one aspect of the present invention, there is provided an electronically controlled power steering system for a vehicle including a steering wheel, comprising:

a vehicle speed sensor means for generating a vehicle speed indicative signal indicative of the vehicle speed;

a steering wheel angle sensor means for generating a steering wheel angle indicative signal indicative of a steering wheel angle of the steering wheel;

a source of pressurized hydraulic fluid;

a power steering gear including a control valve supplied with pressurized hydraulic fluid from said source;

a bypass valve means for regulating a flow rate of hydraulic fluid to be supplied to said power steering gear in response to a control signal; and a controller means responsive to said vehicle speed indicative signal and said steering wheel angle indicative signal for generating said control signal, said controller means including a memory storing a first group of data which is a function of varying vehicle speed value, said first group of data being predetermined for a zero steering wheel angle, said memory storing a second group of data which is a function of varying vehicle speed value, said second group of data being predetermined for a predetermined steering wheel angle that is larger than the zero steering wheel angle, said memory also storing a third group of data including a coefficient variable from zero to one in proportion to varying steering wheel angle when the steering wheel angle is less than said predetermined steering wheel angle, and fixed to one when the steering wheel angle is not less than said predetermined steering wheel angle, said controller means being operative to look up said first and second group of data in response to a given vehicle speed value indicated by said vehicle speed indicative signal and said third group of data in response to a given steering wheel angle value indicated by said steering wheel angle indicative signal to determine a target data which falls between said first and second group of data when the steering wheel angle value indicated by said steering wheel angle indicative signal is less than said predetermined steering wheel angle and which is included by said second group of data when the steering wheel angle value indicated by said steering wheel indicative signal is not less than said predetermined steering wheel angle, said controller means being operative also to vary said control signal in response to said target data determined.

According to another aspect of the present invention, there is provided a method of controlling the degree of power assist in an electronically controlled power steering system for a vehicle including a steering wheel, said power steering system comprising:

a vehicle speed sensor means for generating a vehicle speed indicative signal indicative of the vehicle speed;

a steering wheel angle sensor means for generating a steering wheel angle indicative signal indicative of a steering wheel angle of the steering wheel;

a source of pressurized hydraulic fluid;

a power steering gear including a control valve supplied with pressurized hydraulic fluid from said source;

a bypass valve means for regulating a flow rate of hydraulic fluid to be supplied to said power steering gear in response to a control signal; and a controller means responsive to said vehicle speed indicative signal and said steering wheel angle indicative signal for generating said control signal, said method comprising the steps of:

storing a first group of data which is a function of varying vehicle speed value, said first group of data being predetermined for a zero steering wheel angle;

storing a second group of data which is a function of varying vehicle speed value, said second group of data being predetermined for a predetermined steering wheel angle that is larger than the zero steering wheel angle;

storing a third group of data including a coefficient variable from zero to one in proportion to varing steering wheel angle when the steering wheel angle is less than said predetermined steering wheel angle, and fixed to one when the steering wheel angle is not less than said predetermined steering wheel angle;

looking up said first and second group of data in response to a given vehicle speed value indicated by said vehicle speed indicative signal and said third group of data in response to a given steering wheel angle value indicated by said steering wheel angle indicative signal to determine a target data which falls between said first and second group pf data when the steering wheel angle value indicated by said steering wheel angle indicative signal is less than said predetermined steering wheel angle and which is included by said second group of data when the steering wheel angle value indicated by said steering wheel indicative signal is not less than said predetermined steering wheel angle; and varying said control signal in response to said target data determined.

BRIEF DESCRIPTION OF THE DRAWINGS

FIG. 7 is a time chart illustating typical mode of operation of the electronically controlled power steering system according to the present invention.

DESCRIPTION OF THE PREFERRED EMBODIMENT

Figure 1:
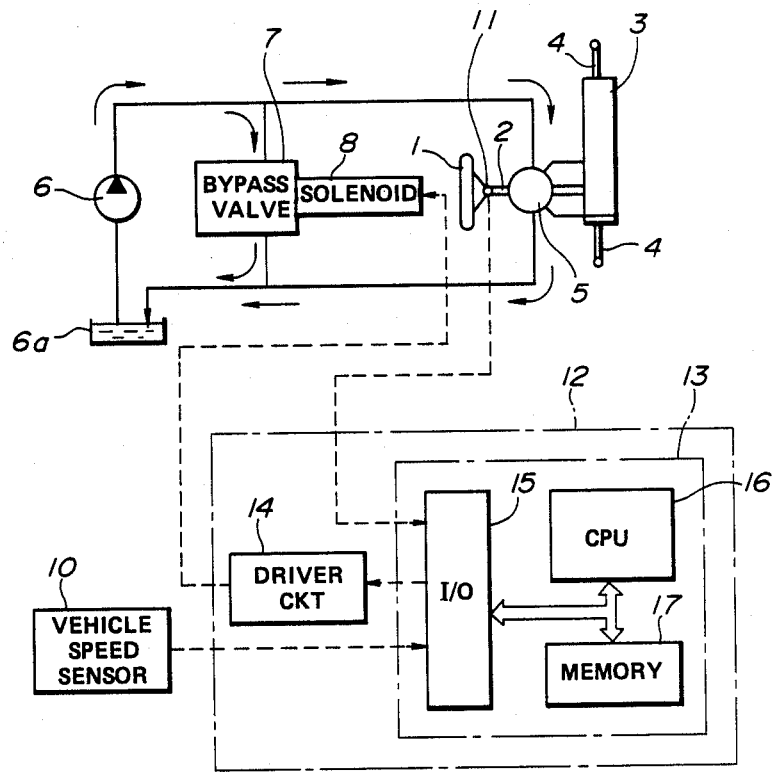
FIG. 1 is a block diagram of an electronically controlled power steering system according to the present invention.

Referring to FIG. 1, an electronically controlled power steering system is described. Reference numeral 1 denotes a steering wheel with a steering shaft 2. Reference numeral 3 denotes a power steering gear of the rack and pinion type, for example, which includes a power cylinder and a rack 4. Both ends of the rack 4 are operatively connected to a pair of dirigible road wheels, not shown, in a well known manner. Reference numeral 5 denotes a power steering control valve which has an inlet port connected to a power steering pump 6, a return port connected to a reservoir 6a, and two outlet ports connected to two chambers of the power cylinder, respectively, in a known manner. Reference numeral 7 denotes a bypass valve operable by a solenoid 8. The bypass valve 7 is arranged in parallel to the power steering control valve 5 in a known manner so as to cause an increase in the flow rate of bypass hydraulic fluid, causing a reduction in the flow rate of hydraulic fluid supplied to the power steering control valve 5. The reduction in the flow rate of hydraulic fluid supplied to the control valve 5 causes a reduction in power assist exerted by the power cylinder to the steering gear 3. This results in an increase in a steering torque required to manipulate the steering wheel 1.

For measuring a vehicle speed, a vehicle speed sensor 10 is provided, and for measuring a steering wheel angle, a steering wheel angle sensor 11 is arranged on the steering shaft 2. Output signals of these sensors 10 and 11 are fed to a controller 12 including a microcomputer 13 and a driver circuit 14. The driver circuit 14 regulates an electric current passing through the solenoid 8 in response to an output signal of the microcomputer 13.

In the conventional manner, the microcomputer 13 includes an input output interface circuit 15, a central processing unit (CPU) 16 and a memory 17. The memory 17 includes a read only memory (ROM) and a random access memory (RAM).

Figure 2:
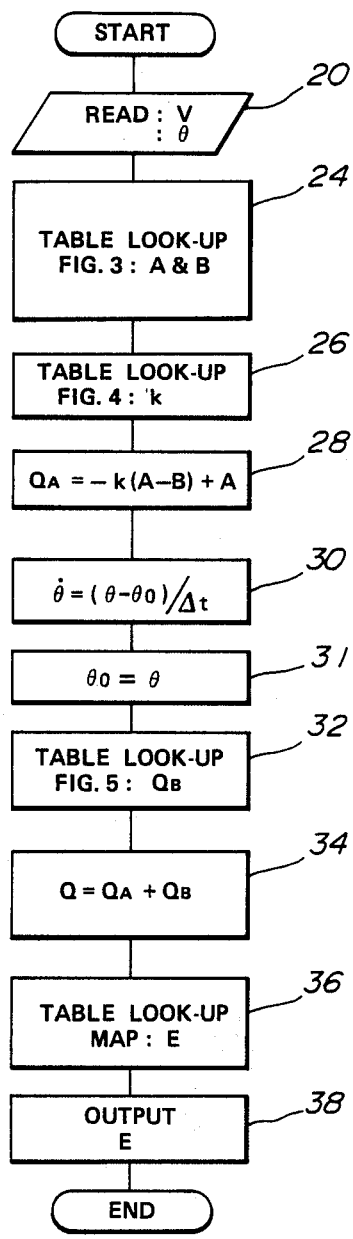
FIG. 2 is a flowchart of a control program stored in a ROM shown in FIG. 1.

Referring mainly to FIG. 2, the operation of this embodiment is explained.

Turning on an ignition switch causes the controller 12 to be connected to a source of electric power. This causes the vehicle speed sensor 10 and the steering wheel angle sensor 11 to generate output signals, respectively, which are supplied to the interface circuit 15.

The CPU 16 executes jobs illustrated in the flow chart shown in FIG. 2. The execution of the jobs is repeated at predetermined intervals.

In FIG. 2, at a step 20, reading of the output signals from the sensors 10 and 11 is executed via the interface circuit 15 and the results are stored in the RAM at an address labelled a vehicle speed V and a steering wheel angle data address $\theta$. At a step 24, the CPU performs a table look-up operation of the data plotted on the curve A shown in FIG. 3 using the vehicle speed V to determine a base flow rate value A of hydraulic fluid to be supplied to the control valve 5 of the power steering gear 3, and also performs a table look-up operation of data plotted on the curve B shown in FIG. 3 using the vehicle spped V to determine a required minimum flow rate value B to be supplied to the control valve 5 of the power steering gear 3. In this embodiment, the required minimum flow rate value B is equal to a base flow rate value of hydraulic fluid to be supplied to the control valve 5 when the steering wheel angle is 40 degrees. Subsequently, at a step 26, the CPU 16 executes a table look-up operation of data table, as illustrated in FIG. 4, stored in the ROM using the steering wheel angle value $\theta$ to determine a coefficient k. As shown in FIG. 4, the coeficient k varies linearly in proportion to a steering wheel angle $\theta$ when the steering wheel angle $\theta$ is zero or less than the predetermined value of 40 degrees. The coefficient k reaches 1 when the steering wheel angle $\theta$ is 40 degrees and thereafter keeps this value even if the steering wheel angle $\theta$ increases beyond 40 degrees.

Figure 5:
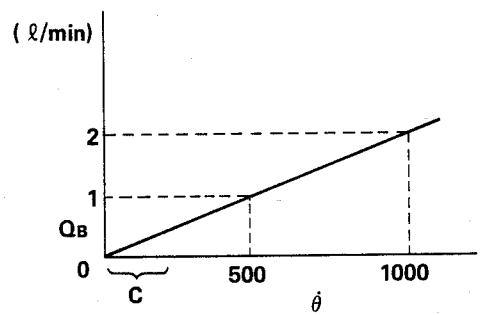
FIG. 5 shows, in a fully drawn line, a correction flow value $Q_B$ versus $\dot\theta$ characteristic stored in the ROM, where: $\dot\theta$ represents a first derivative of a steering wheel angle with respect to time.

Referring back to FIG. 2, at a step 28, a flow rate $Q_A$ is derived from calculating an equation $-k(A-B)+A$. Then, at a step 30, a first derivative of steering wheel angle $\dot{\theta}$ with respect to time is derived from subtracting the content of $\theta_0$ from the content of $\theta$, where the content of $\theta_0$ stores a value which was stored as $\theta$ after reading at the step 20 in the previous run which occured a predetermined period $\Delta t$ (delta t) ago. At the subsequent step 31, the data is copied to the address $\theta_0$ from the address $\theta$. At a step 32, using the content of $\theta$ which is indicative of a speed at which the steering wheel is turned, a correction value $Q_B$ to the flow rate is derived by looking up FIG. 5 stored in the ROM of the memory 17. Then, at a step 34, the content of $Q_B$ is added to the content of $Q_A$ to give the result as Q. At a step 36, a solenoid electric E to be supplied to the solenoid 8 for the bypass valve 7 is derived by looking up a predetermined data map stored in the ROM of the memory 17. Thereafter, a control signal variable responsive to the value E is delivered via the input output interface 15 to the driver circuit 14.

Figure 3:
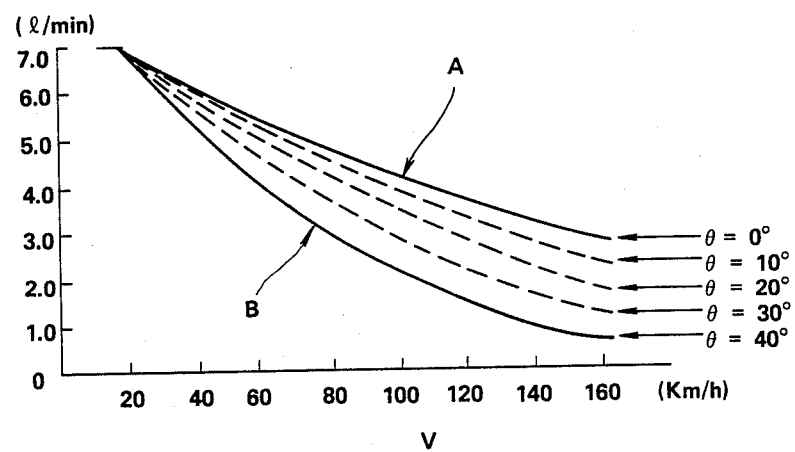
FIG. 3 shows, in a fully drawn line, a characteristic curve A which data are plotted on, each data representing a flow rate of hydraulic fluid to be supplied to a steering gear mechanism versus a given vehicle speed value when a steering wheel angle $\theta$ is zero, and another characteristic curve B which data are plotted on, each data representing a minimum flow rate of hydraulic fluid required to be supplied to the steering gear mechanism versus a given vehicle speed value when the steering wheel angle $\theta$ is a predetermined value of 40 degrees, these data being stored in a ROM of a memory shown in FIG. 1.
Figure 4:
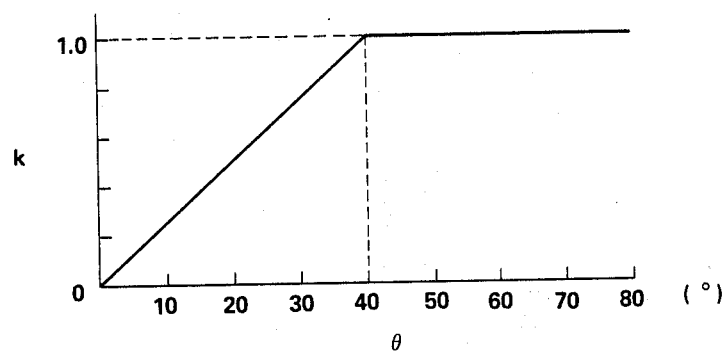
FIG. 4 shows, in a fully drawn line, a coefficient k versus a steering wheel angle $\theta$ characteristic stored in the ROM.
Figure 6:
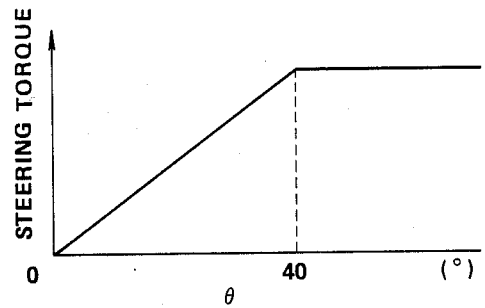
FIG. 6 shows the variation of a steering torque versus the variation of a steering wheel angle $\theta$ in the case of the electronically controlled power steering system according to the present invention.

As will now be recognized from the equation $Q_A = -k(A-B)+A$, neglecting the content of $Q_B$, the flow rate of hydraulic fluid supplied to the power steering control valve 5 decreases from the level indicated by the curve A in FIG. 3 toward the level indicated by the curve B in FIG. 3 in inverse proportion to an increase in a steering wheel angle $\theta$ when the steering wheel angle $\theta$ is zero or less than 40 degrees since the coeffeicient k increases lineally as shown in FIG. 4. However, since the coefficient k is kept constant when the steering wheel angle $\theta$ is equal to or greater than 40 degrees (i.e.,-not less than 40 degrees), the flow rate of hydraulic fluid supplied to the power steering control valve 5 is kept at the level as indicated by the curve B shown in FIG. 3. As a result, with the same vehicle speed V, the degree of power assist decreases as the steering wheel angle $\theta$ increases when the steering wheel angle $\theta$ is ) or less than 40 degrees, while when the steering wheel angle $\theta$ is equal to or larger than 40 degrees, the decreasing tendency of the degree of power assist is restrained and kept at a predetermined degree determined by the level indicated by the curve B. As shown in FIG. 6, the steering torque varies in proportion to steering wheel angle $\theta$ within the range from 0 to 40 degrees, but kept at the predetermined level when the steering wheel angle is equal to or larger than 40 degrees.

The operation of the electronically controlled power steering system according to the present invention is further described in connection with FIG. 7. FIG. 7 is a time chart showing the variation of the flow rate Q of hydraulic fluid supplied to the power steering control valve 5 and the variation of steering torque when, with the same vehicle speed, the steering wheel angle $\theta$ stays zero till the instance $t_1$ and the steering wheel angle $\theta$ increases up to 60 degrees during the time period from the instance $t_1$ to the instance $t_3$, and thereafter the steering wheel angle $\theta$ stays at 60 degrees. As shown by the fully drawn curves, the decreasing tendency of the flow rate Q is restrained when the steering wheel angle $\theta$ is equal to or greater than 40 degrees as different from the conventional tendency as indicated by the broken line curve, and the increasing tendency of the steering torque is restrained as shown by the fully drawn curve when the steering wheel angle $\theta$ is equal to or larger than 40 degrees as different from the conventional tendency as indicated by the broken line curve. Therefore, it will be appreciated that the increasing tendency of steering torque is restrained when the steering wheel is turned through a large steering wheel angle which is greater than the predetermined value of 40 degrees.

What is claimed is:

1. An electronically controlled power steering system for a vehicle including a steering wheel, comprising:
    a vehicle speed sensor means for generating a vehicle speed indicative signal indicative of the vehicle speed;
    a steering wheel angle sensor means for generating a steering wheel angle indicative signal indicative of a steering wheel angle of the steering wheel;
    a source of pressurized hydraulic fluid;
    a power steering gear including a control valve supplied with pressurized hydraulic fluid from said source;
    a bypass valve means for regulating a flow rate of hydraulic fluid to be supplied to said power steering gear in response to a control signal; and
    a controller means responsive to said vehicle speed indicative signal and said steering wheel angle indicative signal for generating said control signal, said controller means being operative to vary said control signal in response to said vehicle speed indicative signal and said steering wheel angle indicative signal when said steering wheel angle indicative signal is less than a predetermined value, but restraining the varying tendency of said control signal in response to said steering wheel angle indicative signal when said steering wheel angle indicative signal is not less than said predetermined value.

2. An electronically controlled power steering system for a vehicle including a steering wheel, comprising:
    a vehicle speed sensor means for generating a vehicle speed indicative signal indicative of the vehicle speed;
    a steering wheel angle sensor means for generating a steering wheel angle indicative signal indicative of a steering wheel angle of the steering wheel;
    a source of pressurized hydraulic fluid;
    a power steering gear including a control valve supplied with pressurized hydraulic fluid from said source;
    a bypass valve means for regulating a flow rate of hydraulic fluid to be supplied to said power steering gear in response to a control signal; and
    a controller means responsive to said vehicle speed indicative signal and said steering wheel angle indicative signal for generating said control signal, said controller means including a memory storing a first group of data which is a function of varying vehicle speed value, said first group of data being predetermined for a zero steering wheel angle, said memory storing a second group of data which is a function of varying vehicle speed value, said second group of data being predetermined for a predetermined steering wheel angle that is larger than the zero steering wheel angle, said memory also storing a third group of data including a coefficient variable from zero to one in proportion to varying steering wheel angle when the steering wheel angle is less than said predetermined steering wheel angle, and fixed to one when the steering wheel angle is not less than said predetermined steering wheel angle, said controller means being operative to look up said first and second group of data in response to a given vehicle speed value indicated by said vehicle speed indicative signal and said third group of data in response to a given steering wheel angle value indicated by said steering wheel angle indicative signal to determine a target data which falls between said first and second group of data when the steering wheel angle value indicated by said steering wheel angle indicative signal is less than said predetermined steering wheel angle and which is included by said second group of data when the steering wheel angle value indicated by said steering wheel indicative signal is not less than said predetermined steering wheel angle, siad controller means being operative also to vary said control signal in response to said target data determined.

3. An electronically controlled power steering system as claimed in claim 2, wherein said controller means is operative also to vary said control signal in response to a first derivative of steering wheel angle.

4. A method of controlling the degree of power assist in an electronically controlled power steering system for a vehicle including a steering wheel, said power steering system comprising:
 a vehicle speed sensor means for generating a vehicle speed indicative signal indicative of the vehicle speed;
 a steering wheel angle sensor means for generating a steering wheel angle indicative signal indicative of a steering wheel angle of the steering wheel;
 a source of pressurized hydraulic fluid;
 a power steering gear including a control valve supplied with pressurized hydraulic fluid from said source;
 a bypass valve means for regulating a flow rate of hydraulic fluid to be supplied to said power steering gear in response to a control signal; and
 a controller means responsive to said vehicle speed indicative signal and said steering wheel angle indicative signal for generating said control signal, said method comprising the steps of:
 storing a first group of data which is a function of varying vehicle speed value, said first group of data being predetermined for a zero steering wheel angle;
 storing a second group of data which is a function of varying vehicle speed value, said second group of data being predetermined for a predetermined steering wheel angle that is larger than the zero steering wheel angle;
 storing a third group of data including a coefficient variable from zero to one in proportion to varying steering wheel angle when the steering wheel angle is less than said predetermined steering wheel angle, and fixed to one when the steering wheel angle is not less than said predetermined steering wheel angle;
 looking up said first and second group of data in response to a given vehicle speed value indicated by said vehicle speed indicative signal and said third group of data in response to a given steering wheel angle value indicated by said steering wheel angle indicative signal to determine a target data which falls between said first and second group of data when the steering wheel angle value indicated by said steering wheel angle indicative signal is less than said predetermined steering wheel angle and which is included by said second group of data when the steering wheel angle value indicated by said steering wheel indicative signal is not less than said predetermined steering wheel angle; and
 varying said control signal in response to said target data determined.

* * * * *